United States Patent
Shen et al.

(10) Patent No.: US 11,378,549 B2
(45) Date of Patent: Jul. 5, 2022

(54) GAS SENSOR AND MANUFACTURING METHOD THEREOF, AND GAS SENSING SYSTEM

(71) Applicant: I-Shou University, Kaohsiung (TW)

(72) Inventors: Chi-Yen Shen, Kaohsiung (TW); Tien-Tsan Hung, Kaohsiung (TW); Jing-Jay Chiu, Kaohsiung (TW); Ming Wen Yang, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 215 days.

(21) Appl. No.: 16/825,684

(22) Filed: Mar. 20, 2020

(65) Prior Publication Data
US 2021/0293755 A1    Sep. 23, 2021

(51) Int. Cl.
*G01N 29/02* (2006.01)
*G01N 27/12* (2006.01)

(52) U.S. Cl.
CPC ......... *G01N 29/022* (2013.01); *G01N 27/126* (2013.01); *G01N 2291/021* (2013.01); *G01N 2291/0235* (2013.01); *G01N 2291/0257* (2013.01); *G01N 2291/0423* (2013.01)

(58) Field of Classification Search
CPC .. G01N 29/022; G01N 29/036; G01N 29/222; G01N 2291/021; G01N 2291/0235; G01N 2291/0257; G01N 2291/0423; G01N 2291/0255; G01N 2291/0256; G01N 27/126
See application file for complete search history.

(56) References Cited

U.S. PATENT DOCUMENTS

| | | | |
|---|---|---|---|
| 2005/0150778 A1* | 7/2005 | Lewis | G01N 27/126 205/777.5 |
| 2010/0139389 A1* | 6/2010 | Morita | G01F 1/6845 73/204.11 |
| 2012/0047994 A1* | 3/2012 | Shen | G01N 29/022 73/24.06 |
| 2020/0029466 A1* | 1/2020 | Long | H05K 7/20254 |

* cited by examiner

*Primary Examiner* — Suman K Nath
(74) *Attorney, Agent, or Firm* — Muncy, Geissler, Olds & Lowe, P.C.

(57) ABSTRACT

A gas sensor comprises a basic part and a sensing layer deposited on the basic part. The basic part includes a circuit board and at least one surface acoustic wave element disposed on the circuit board. The sensing layer is a nanocomposite film of reduced graphene oxide/tungsten oxide/polypyrrole deposited on the surface acoustic wave element. The sensing layer combines reduced graphene oxide, metal oxide, and conductive polymer, so that the sensing layer is able to perform sensing at room temperature, and can be more sensitive. The present invention provides a method for manufacturing a gas sensor, and a gas sensing system including the gas sensor.

8 Claims, 10 Drawing Sheets

GAS SENSOR AND MANUFACTURING METHOD THEREOF, AND GAS SENSING SYSTEM

BACKGROUND OF THE INVENTION

1. Field of the Invention

The present invention relates to a sensing component and a manufacturing method thereof, and more particularly to a gas sensor and manufacturing method thereof, and a gas sensing system.

2. Description of the Prior Art

Due to industrialization, atmospheric particulate matter or chemicals are often inhaled through the respiratory system (such as suspended matters, ammonia, sulfides, nitrogen oxides), which has a significant impact on human health. Therefore, it is very important to use gas sensors to detect air toxics.

In addition, in medical diagnosis, some diseases are often clinically detected at the late stage of the disease. If sensing technology can be used, the possibility of disease onset (such as asthma, respiratory diseases) can be detected earlier for immediate treatment or prevention.

Asthma is a common chronic respiratory disease. Detection of respiratory diseases requires complicated and time-consuming medical instrument to perform pulmonary function tests. Medical reports have mentioned that the concentration of nitric oxide (NO) gas exhaled by asthmatic patients will be higher than that of normal people, and the concentration of nitric oxide exhaled by normal people is between 5-35 ppb (children have slightly lower level, between 5-25 ppb). Patients with asthma have higher levels of nitric oxide, ranging between 25-80 ppb, and the higher the concentration of nitric oxide when the asthma worsens.

Methods commonly used to detect nitric oxide include spectrometry, mass spectrometry, chromatography, and fluorometry. The above methods have their advantages and disadvantages, but they all require large-volume expensive equipment for analysis and requires trained operators. As for the conventional nitric oxide sensor, it usually uses impedance to directly outputs the electrical signal when triggered by the target. Although it is low-cost and cheap, it has the disadvantages of low sensitivity, low stability and long response time.

SUMMARY OF THE INVENTION

Therefore, a feature of an embodiment of the present invention is to provide a gas sensor with high sensitivity capable of performing at room temperature.

The gas sensor comprises a basic part, and a sensing layer deposited on the basic part. The basic part includes a circuit board, and at least one surface acoustic wave element disposed on the circuit board. The sensing layer is deposited on the surface acoustic wave element, and the sensing layer is a nanocomposite film of reduced graphene oxide/tungsten oxide/polypyrrole.

Another technique of an embodiment of the present invention is that in the sensing layer, a novel nanocomposite film is provided, in which the weight ratio of reduced graphene oxide:tungsten oxide:polypyrrole is between 1:1:2 and 3:1:5.

Another feature of an embodiment of the present invention is to provide a gas sensing system including the gas sensor.

The gas sensing system comprises a bearing unit provided with a gas flow channel, a gas sensor, and a detecting unit. The gas sensor is disposed in the bearing unit and capable of sensing the gas flowing from the gas flow channel. The gas sensor includes a basic part and a sensing layer deposited on the basic part. The basic part is provided with a circuit board, and at least one surface acoustic wave element disposed on the circuit board. The sensing layer is a nanocomposite film of reduced graphene oxide/polypyrrole/tungsten oxide. The detecting unit is electrically connected to the gas sensor.

Another technique of an embodiment of the present invention is that the bearing unit includes a base, an upper cover capable of opening and closing relative to the base, and a sealing ring provided on one side of the upper cover facing the base. The gas sensor is provided on the base, when the upper cover is closed on the base, the sealing ring presses against the base and define a space, and the surface acoustic wave element is located in the space.

Another technique of an embodiment of the present invention is that the gas flow channel is located on the upper cover and provided with an inlet, a first hole communicating with the inlet, a second hole spaced from the first hole, and an outlet communicating with the second hole. The first hole and the second hole are located in the area surrounded by the sealing ring and correspond to the position where the surface acoustic wave element is located.

Another feature of an embodiment of the present invention is to provide a manufacturing method of the gas sensor, comprising a basic part manufacturing step, and a sensing layer manufacturing step. In the basic part manufacturing step, a surface acoustic wave element is placed on a circuit board. In the sensing layer manufacturing step, tungsten oxide gel and reduced graphene oxide are added into pyrrole monomers to prepare a nanocomposite gel of reduced graphene oxide/tungsten oxide/polypyrrole by an in-situ chemical oxidative polymerization approach, and the nanocomposite gel is coated on the surface acoustic wave element and dried to form a sensing layer. The sensing layer is a nanocomposite film of reduced graphene oxide/tungsten oxide/polypyrrole.

Another technique of an embodiment of the present invention is that in the sensing layer manufacturing step, the weight ratio of reduced graphene oxide:tungsten oxide:polypyrrole is between 1:1:2 and 3:1:5.

Another technique of an embodiment of the present invention is that in the sensing layer manufacturing step, ammonium persulfate is added to the mixture of tungsten oxide/reduced graphene oxide/pyrrole and maintains the temperature below 10° C., so that the pyrrole monomer is able to polymerize.

Another technique of an embodiment of the present invention is that in the sensing layer manufacturing step, the nanocomposite gel is spin-coated on the surface acoustic wave element, and after being dried, it is placed in an oven for annealing.

The advantage of the embodiments in this present invention is that the sensing layer is a nanocomposite film of reduced graphene oxide/tungsten oxide/polypyrrole, which combines reduced graphene oxide, metal oxide and conductive polymer, so that the sensing layer is able to perform sensing at room temperature, and can be more sensitive.

DETAILED DESCRIPTION OF THE EMBODIMENTS

Figure 1:
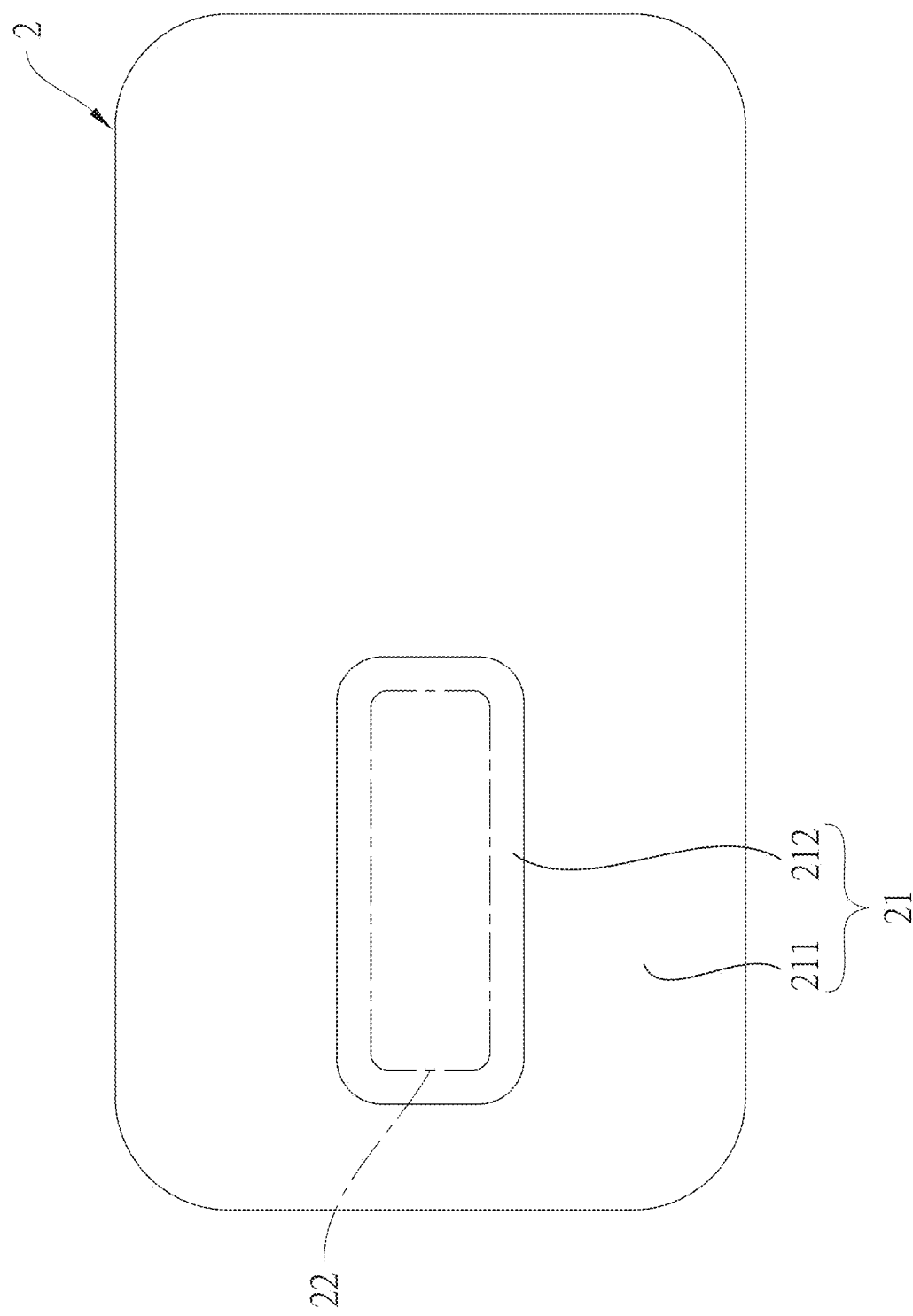
FIG. 1 is schematic diagram illustrating an embodiment of a gas sensor according to the present invention.

Specific structural and functional details disclosed herein will become apparent from the following description of the embodiments of the present invention taken in conjunction with the accompanying drawings, which provides better understanding to a person having ordinary skill in the art but shall not be construed as limiting the invention. Wherever possible, the same reference numbers are used in the drawings and the description to refer to the same or like parts.

Refer to FIG. 1, an embodiment of a gas sensor 2 according to the present invention is provided, comprising a basic part 21, and a sensing layer 22 disposed on the basic part 21. The basic part 21 includes a circuit board 211, and a surface acoustic wave element 212 disposed on the circuit board 211.

Firstly, a manufacturing method of the gas sensor 2 according to the present invention is described, which includes a basic part manufacturing step and a sensing layer manufacturing step.

Figure 2:
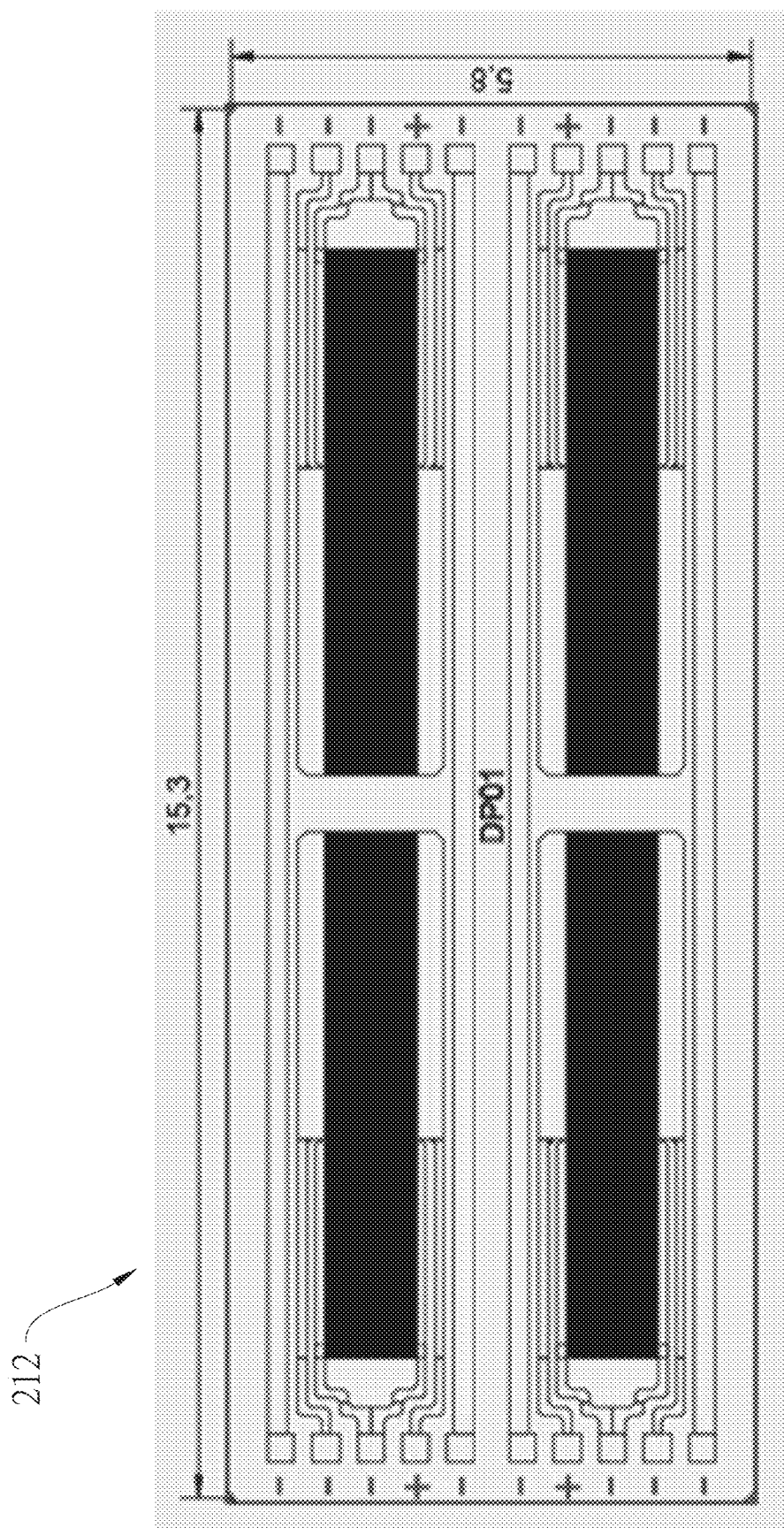
FIG. 2 is a schematic diagram illustrating the structure of a surface acoustic wave element in FIG. 1.

The basic part manufacturing step is to place the surface acoustic wave element 212 on the circuit board 211. In this embodiment, the surface acoustic wave element 212 is fabricated on the circuit board 211 made of a quartz wafer by lift-off and sputtering. It should be particularly noted that, in order to reduce the interference in the environment (such as temperature, pressure, and humidity) during sensing, in this embodiment, the surface acoustic wave element 212 is designed as a dual-channel structure as shown in FIG. 2. However, in actual implementation, it can also be designed as a single-channel structure, and shall not be construed as limiting the invention. Each channel element has 10 electrical signals, and both left and right sides are respectively provided with 5 electrical signals, in which two are positive signals, and the rest are negative signals. Therefore, one channel must have ten wires. The negative signals on each side of each channel are the ground electrode, which is mainly used to shield the signals of the surface acoustic wave element 212 from interfering with each other. The metal material used for the IDT (Interdigital Transducer) on the circuit board 211 is aluminum. Since the aluminum is a lighter metal, the mass loading effect on the surface acoustic wave element 212 is smaller. Moreover, the price of aluminum is cheaper.

In order to test the surface acoustic wave element 212, the surface acoustic wave element 212 is fixed on the circuit board 211, and the electrodes of the surface acoustic wave element 212 is connected to the circuit board 211 by gold wires. To prevent the connected gold wires from falling off, the die coating is performed on the gold wires on both sides of the elements. It should be particularly noted that the adhesive cannot adhere to any part of the IDT of the surface acoustic wave element 212, otherwise the operation of the circuit board 211 may be affected. After the basic part 21 is manufactured, the test of response characteristics, circuit impedance matching, and oscillation condition of the circuit need to be performed, so that the properties of the basic part 21 such as response time and oscillation stability can be confirmed. Since the above test process and test conditions are not the focus of this present invention, the further details will not be described hereinafter. It should also be noted that, in this embodiment, the circuit board 211 is selected from a matched chip with an insertion loss (−9~−10 dB).

Next, in the sensing layer manufacturing step, the sensing layer 22 is prepared. The sensing layer 22 is a nanocomposite film of reduced graphene oxide/tungsten oxide/polypyrrole. In this embodiment, the reduced graphene oxide and tungsten oxide are prepared respectively, and then the nanocomposite film is prepared.

A method for preparing graphene oxide (GO) is described below. 5 g of graphite powder, 2.5 g of potassium persulfate ($K_2S_2O_8$), 2.5 g of phosphorus pentoxide ($P_2O_5$), 20 ml of sulfuric acid ($H_2SO_4$) are mixed in a 50 ml conical flask, and stirred at 80° C. for 6 hours, and then cooled for stirring overnight. In an ice bath, 5 g of sodium nitrate ($NaNO_3$), 50 ml of sulfuric acid ($H_2SO_4$), and graphite powder are mixed in a 500 ml volumetric flask. The mixture is stirred at 0-5° C. for 30 minutes, and 30 g of potassium permanganate is slowly added to avoid the temperature rising above 15° C. Then, the ice bath is removed and the mixture is stirred at 35° C. for 2 hours. The suspension is diluted with 230 ml of deionized water, and after raising its temperature to 98° C. immediately, it is stirred for 2 hours. Next, the solution is further diluted with 100 ml of deionized water. Keep stirring, and 50 ml of hydrogen peroxide (30 wt %) is added to remove excess potassium permanganate. The mixture is rinsed with 1% hydrochloric acid (HCl), and separated by centrifugation, and then washed with deionized water to have a natural pH. After filtration, it is dried under vacuum at 55° C., so that graphene oxide can be obtained.

After graphene oxide is obtained, preparation of reduced graphene oxide (rGO) is performed. In an ultrasonic bath, 300 mg of graphene oxide was dispersed in 100 ml of deionized water. After adding hydrazine hydrate (1 ml/per 100 mg of graphene oxide), it reacts at 95° C. for 1 hour, and reduced graphene oxide can be obtained. The product was collected by filtration and washed several times with deionized water to remove excess hydrazine. After drying, it was sieved in a vacuum oven at 60° C., so that reduced graphene oxide in black powder can be obtained.

Next, a tungsten oxide ($WO_3$) gel is prepared. 3 g of tungsten hexachloride ($WCl_6$, Aldrich Chemical, >99.9%) is mixed with 50 ml of ethanol and stirred, so that a lemon-yellow solution can be obtained. After 10 minutes, since $W^{6+}$ was reduced by ethanol, the solution turns blue. Then, 5 ml of 0.5M ammonia hydroxide ($NH_4OH$, Fisher Scientist, reagent grade) solution is added dropwise, and stirred for 24 hours, so that a white tungsten (VI) oxide gel can be obtained. The precipitate is washed with deionized water, and the chloride ions can be removed, which is performed until no precipitate is generated using the method that the washing solution is titrated with a 0.1 M silver nitrate solution and separated by centrifugation. The washed precipitate is colloidized with ammonia water (ammonia hydroxide, $NH_4OH$), and 25 μl of surfactant (Sigma, Triton X-100) is added to the solution, so that 50 ml of $WO_3$ gel can be obtained.

Figure 3:
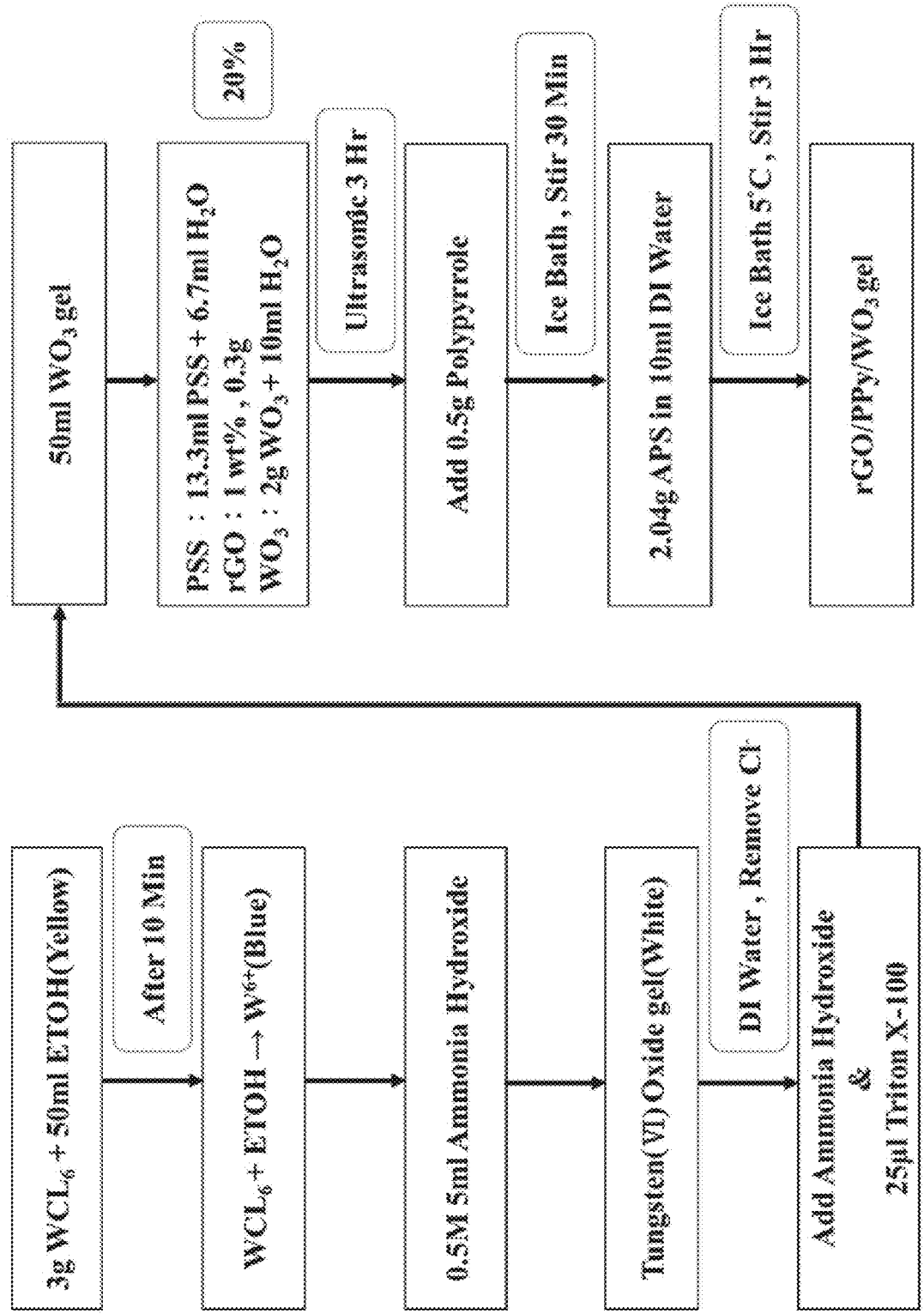
FIG. 3 is a flowchart illustrating an embodiment of a manufacturing method of a gas sensor according to the present invention.

Then, a nanocomposite gel of reduced graphene oxide/tungsten oxide/polypyrrole ($rGO/WO_3/PPy$) is prepared. The nanocomposite gel of $rGO/WO_3/PPy$ is produced by a synthetic method using in situ chemical oxidation polymerization. Different weight ratios of PSS (polystyrene sulfonic acid) is prepared in distilled water, and magnets, 1 wt % rGO, different weight percentages of $WO_3$ gel, and surfactant solution (sodium dodecyl sulfate, SDS) are added in the reaction container. Then, it is in ultrasonic treatment for 3 hours, a soft template is formed in the solution. 0.5 g of fresh distilled pyrrole monomer is slowly added dropwise to the stirring solution, and stirring was continued in an ice bath for 30 minutes. 2.04 g of APS (ammonium persulfate) is dissolved in 10 ml of distilled water, and is slowly added to the solution. This polymerization reaction is continuously stirred at 5° C. for 3 hours, so that a nanocomposite gel of $rGO/WO_3/PPy$ can be obtained. It can be known from the above preparation process that in this embodiment, the amount of reduced graphene oxide:tungsten oxide:polypyrrole in the nanocomposite gel is 0.3 g:0.15 g:0.5 g, and the weight ratio is between 1:1:2 and 3:1:5. The above preparation process is shown in FIG. 3.

After the preparation of the $rGO/WO_3/PPy$ nanocomposite gel is completed, the nanocomposite gel can be coated on the basic part 21. The basic part 21 includes the circuit board 211 and a surface acoustic wave element 212 disposed on the circuit board 211. Since impurities on the surface of the basic part 21 may affect the accuracy of sensing and measurement, the impurities attached to the basic part 21 need to be cleaned first to facilitate subsequent operations. The cleaning procedure is as follows:

1. The basic part 21 is placed in a beaker containing acetone, and then cleaned with an ultrasonic cleaner for 3 minutes, so that impurities on the basic part 21 can be removed.
2. After acetone, the basic part 21 is placed in a beaker containing ethanol and cleaned by ultrasonic cleaning for 3 minutes, so that the residual acetone on the basic part 21 can be removed.
3. Cleaned with deionized water by ultrasonic cleaning for 3 minutes, so that the residual ethanol on the basic part 21 can be removed.
4. Finally, to dry the surface of the basic part 21 with dry air.

After the above cleaning procedure is completed, the coating operation can be started. Since the nanocomposite film is a composite material of a polymer conductive polymer, a semiconductor metal oxide, and rGO, it has conductivity. If the nanocomposite gel is stained on the IDT of the surface acoustic wave element 212 during the coating process, a short circuit will occur in the component. Therefore, the cleaned and dried component is placed under a microscope, and heat-resistant insulating tape (Kapton tape KA200 used in this example) is used to cover the uncoated area, so that it can prevent the IDT of the surface acoustic wave element 212 from being coated with the nanocomposite gel. Then, a pipette is used to draw up the gel, and release a drop onto the area not covered by the heat-resistant insulating tape, and then spin coating is performed at 2500 rpm for 60 seconds to complete the coating of nano composite gel. The coated basic part 21 is then placed in a sealed container filled with nitrogen for one day at room temperature. Then, the heat-resistant insulating tape is removed, and the coated basic part 21 is put into a vacuum oven to anneal at 100° C. for 1 hour. After the above steps, the production of the gas sensor 2 is completed.

Figure 4:
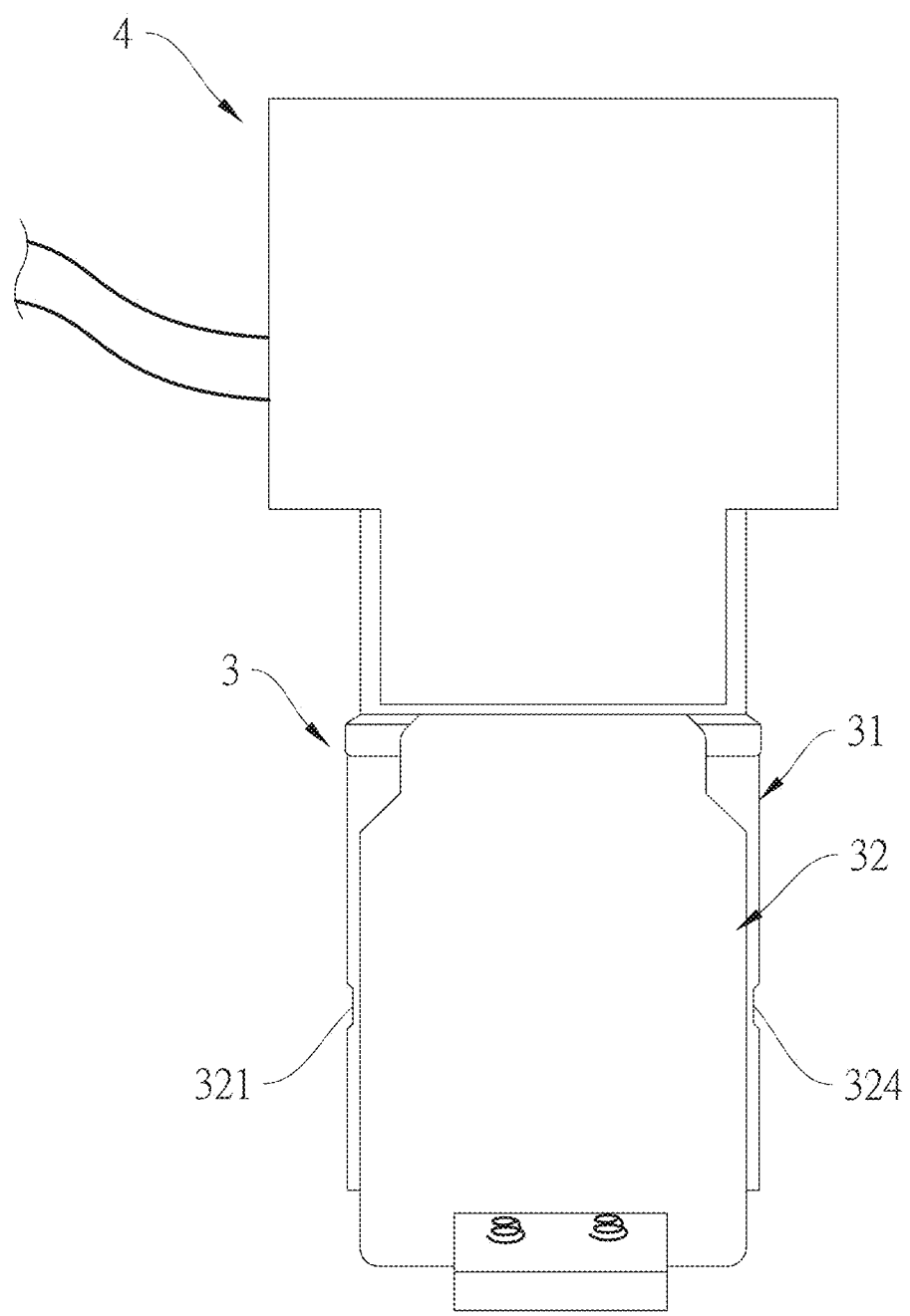
FIG. 4 is a schematic diagram illustrating an embodiment of a gas sensing system according to the present invention.
Figure 5:
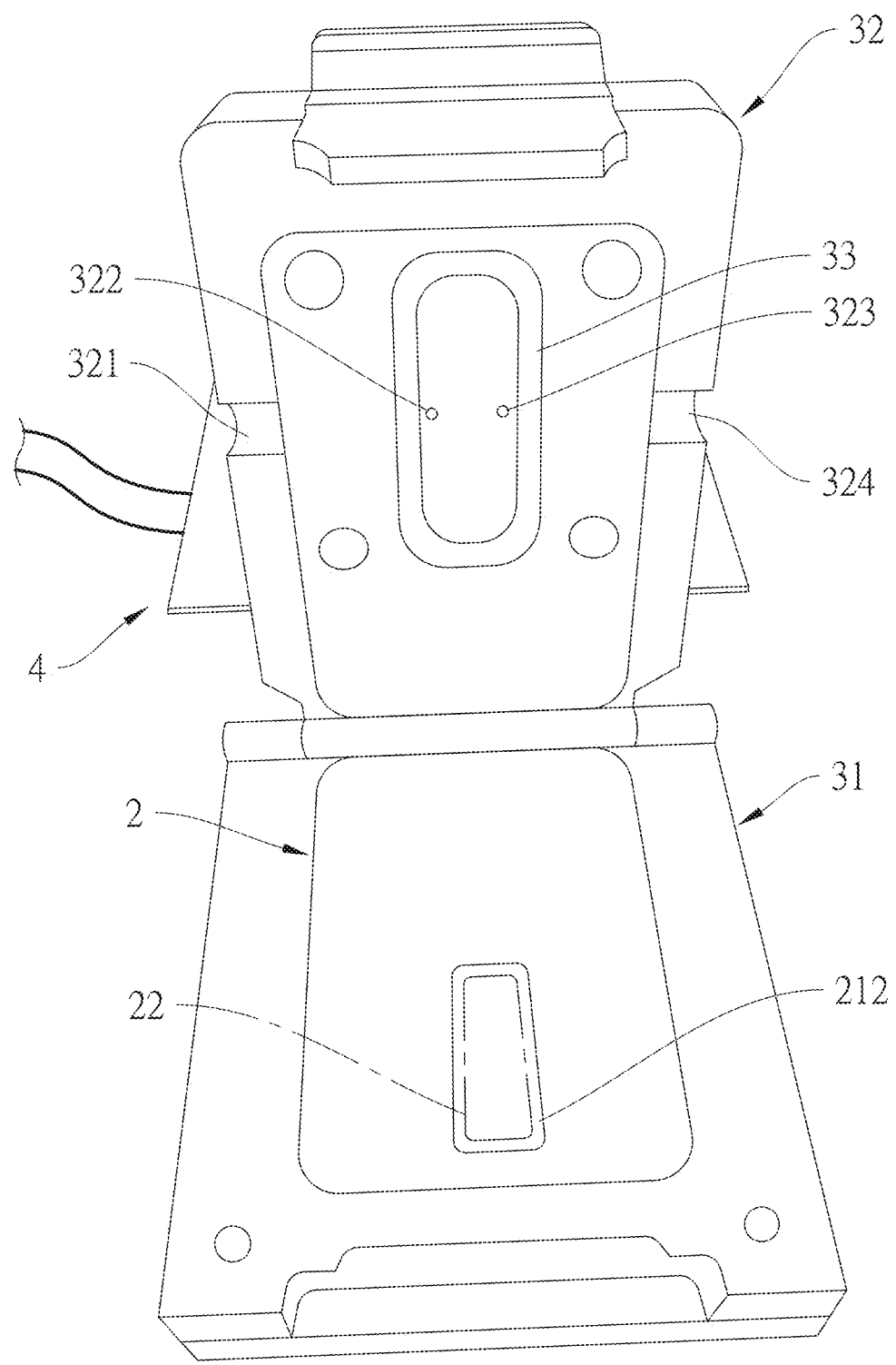
FIG. 5 is a schematic diagram illustrating an opened state of the upper cover in FIG. 4.

Refer to FIGS. 4 and 5, the gas sensor 2 is used with a bearing unit 3 and a detection unit 4, which is the gas sensing system of the present invention. The bearing unit 3 includes a base 31, an upper cover 32 capable of opening and closing relative to the base 31, and a sealing ring 33 disposed on one side of the upper cover 32 facing the base 31. The gas sensor 2 is disposed on the base 31. The upper cover 32 forms a gas flow channel, which is provided with an inlet 321, a first hole 322 communicating with the inlet 321, and a second hole 323 spaced from the first hole 322 and an outlet 324 communicating with the second hole 323. The first hole 322 and the second hole 323 are disposed on the same side as the sealing ring 33, and are located in the area surrounded by the sealing ring 33 and correspond to the position where the surface acoustic wave element 212 is located. When the upper cover 32 is closed on the base 31, the sealing ring 33 is pressed against the base 31 and define a space, and the surface acoustic wave element 212 is located in the space.

Figure 6:
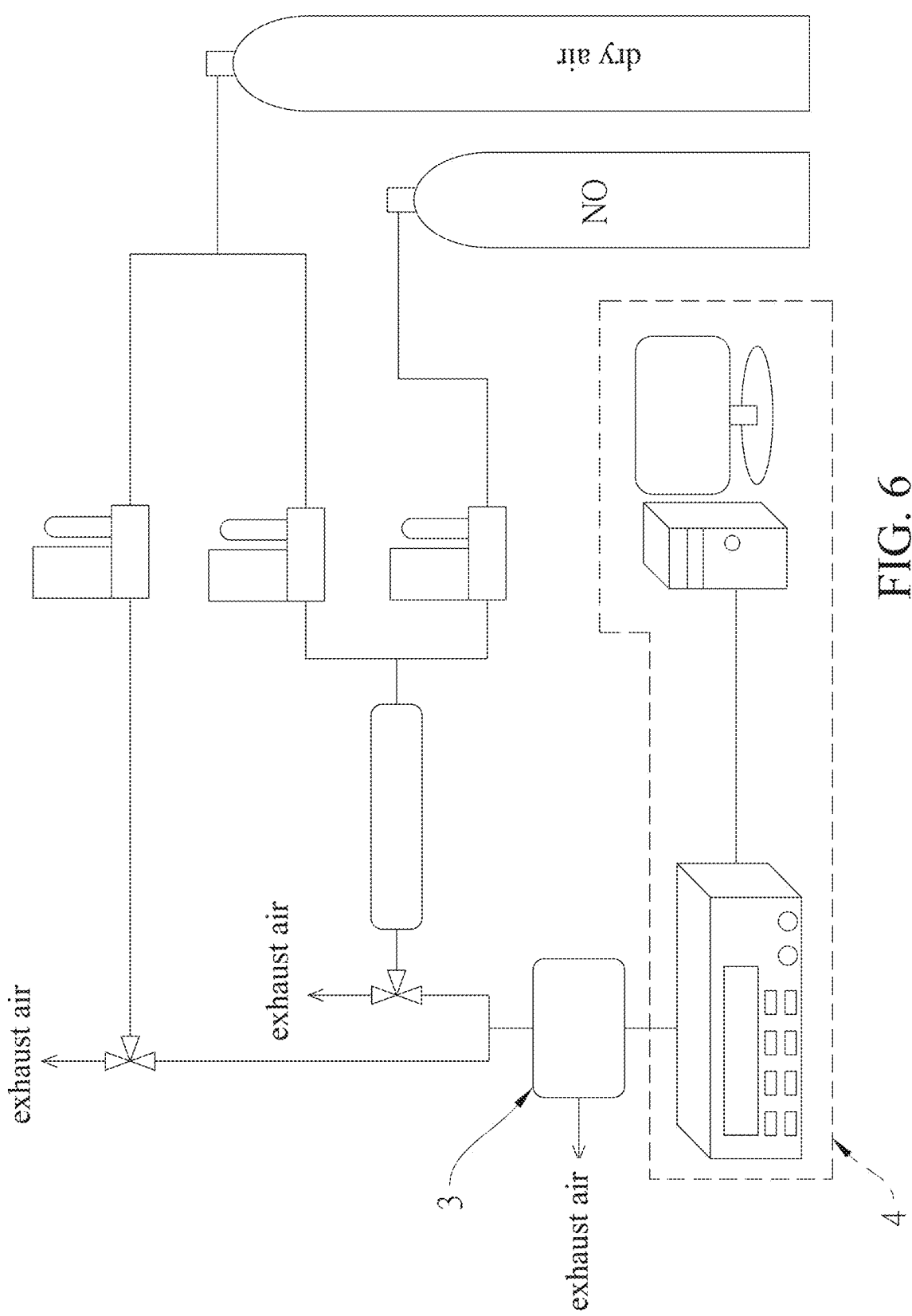
FIG. 6 is a structural diagram illustrating the overall structure of the gas sensing system and the gas flow direction during sensing.

Refer to FIG. 6, it is a structural diagram of the gas sensing system of the present invention. In the embodiment, the gas used for sensing is nitric oxide (NO), and dry air is used as the carrier gas. The temperature in the experiment is about 23° C., which is close to room temperature. The inflow and outflow of the detected gas is controlled by a gas control valve. Lastly, the testing data for calculation and analysis is captured by the detection unit 4.

Refer to FIGS. 4 and 5, when testing is performed, the detected gas is allowed to enter through the inlet 321 of the bearing unit 3, and then enters into the space surrounded by the sealing ring 33 through the first hole 322, so that the detected gas can be brought into contact with the surface acoustic wave element 212 for sensing, and then discharged through the second hole 323 and the outlet 324. The sealing ring 33 can prevent gas from leaking quickly between the base 31 and the upper cover 32, and can ensure that the contact is kept between the surface acoustic wave element 212 and the detected gas.

When the surface acoustic wave element 212 is applied to sensing technology, changes will occur due to the interaction between the piezoelectric material, the sensing coating, and the detected object. They not only affect the wave velocity (frequency) of the components, but also affect the amplitude and phase of the sound waves. By measuring the change in frequency, it can help determine which mechanism is mainly affected by the sensor. For the surface acoustic wave element 212, there are three main perturbation mechanisms, namely mass loading, acoustoelectric effect, and elastic effect.

Mass loading: because the analyte molecules are attached to the surface of the surface acoustic wave element 212, a mass loading is generated, which changes the wave velocity of the surface acoustic wave element 212, thereby shifting the center frequency of the component. Generally, the mass loading is the easiest one to be observed among the three effects occurring in gas sensors, and its reaction equation is as shown in equation (1):

$$\frac{\Delta v}{v_0} = -\omega h(c_1 + c_2 + c_3)\rho \qquad (1)$$

Wherein ω is the angular frequency of the component, h is the coating thickness, $c_i$ is the mass sensitivity, and $$\rho = \left(\frac{m}{A}\right) \quad (5)$$

is the mass change per unit area. It can be known from the equation (1) that when the mass is increased, the wave velocity of the SAW component is reduced.

Elastic effect: this effect is considered only when using an elastic sensing coating. Because the sensing layer of the present invention is a polymer material, the influence of the elastic effect must be considered. When the coating is deformed, which will cause the energy to be stored or lost, the energy and wave velocity transmitted by SAW will be affected. If the thickness of the coating is limited within a certain range $$\left(R = \frac{Af v_0 \rho h}{|G|} \ll 1\right),$$

the relationship between the elastic effect and the SAW change is as shown in equation (2):

$$\frac{\Delta v}{v_0} = 4c_e f_0(\Delta hG') \quad (2)$$

Wherein $c_e$ is the elasticity coefficient of the sensing layer, h is the thickness of the sensing layer, and G' is the shear modulus of the sensing layer.

Acoustoelectric effect: the acoustoelectric effect is mainly decided by whether the used coating has conductivity or not. The surface acoustic wave element 212 is transmitted along with the potential wave. If the coating has conductivity, when the surface acoustic wave element 212 transmits, the accompanying potential wave will be induced on the surface charge of the coating, and thereby the electric field of the coating will be changed. According to the change of the wave velocity generated by the acoustoelectric effect, equation (3) can be summarized:

$$\frac{\Delta v}{v_0} = -\frac{K^2}{2}\frac{1}{(v_0 C_s/\sigma_s)^2 + 1} \quad (3)$$

Wherein $K^2$ is the electromechanical coupling coefficient of the piezoelectric material, $C_s$ is the static capacitance value per unit length of the piezoelectric material, and $\sigma_s$ is the sheet conductivity of the sensing coating. The piezoelectric material used in the present invention is ST-X Quartz, $v_0$ (propagation speed) is 3158 m/s, and $K^2$ is 0.0011.

From equation (3), it can be known that when $(v_0 C_s/\sigma_s)^2 \approx 0$, the influence of the acoustoelectric effect is the largest. The materials of the rGO/WO$_3$/PPy nanocomposite film used in the present invention including rGO, WO$_3$, and PPy, since they are all conductive, the present invention needs to consider the acoustoelectric effect.

Finally, the above three kinds of perturbation effects are integrated into equation (4) to represent the result caused by the three perturbation effects on the wave velocity of the surface acoustic wave element 212:

$$\frac{\Delta f}{f_0} \cong \frac{\Delta v}{v_0} = -c_m f_0 \Delta\left(\frac{m}{A}\right) + 4c_e f_0(\Delta hG') - \frac{K^2}{2}\Delta\frac{1}{(v_0 C_s/\sigma_s)^2 + 1} \quad (4)$$

In equation (4), it can be known that the mass loading and the acoustoelectric effect cause the surface acoustic wave velocity to show a negative change, while the elastic effect causes the wave velocity to show a positive change. Besides, due to $$\frac{\Delta f}{f_0} = \frac{\Delta v}{v_0},$$

the influence of the acoustic wave velocity can be known via the measurement of the frequency change. Equation (4) shows that the sensing capability of the surface acoustic wave element 212 is directly related to the frequency response, that is, the sensitivity.

Figure 7:
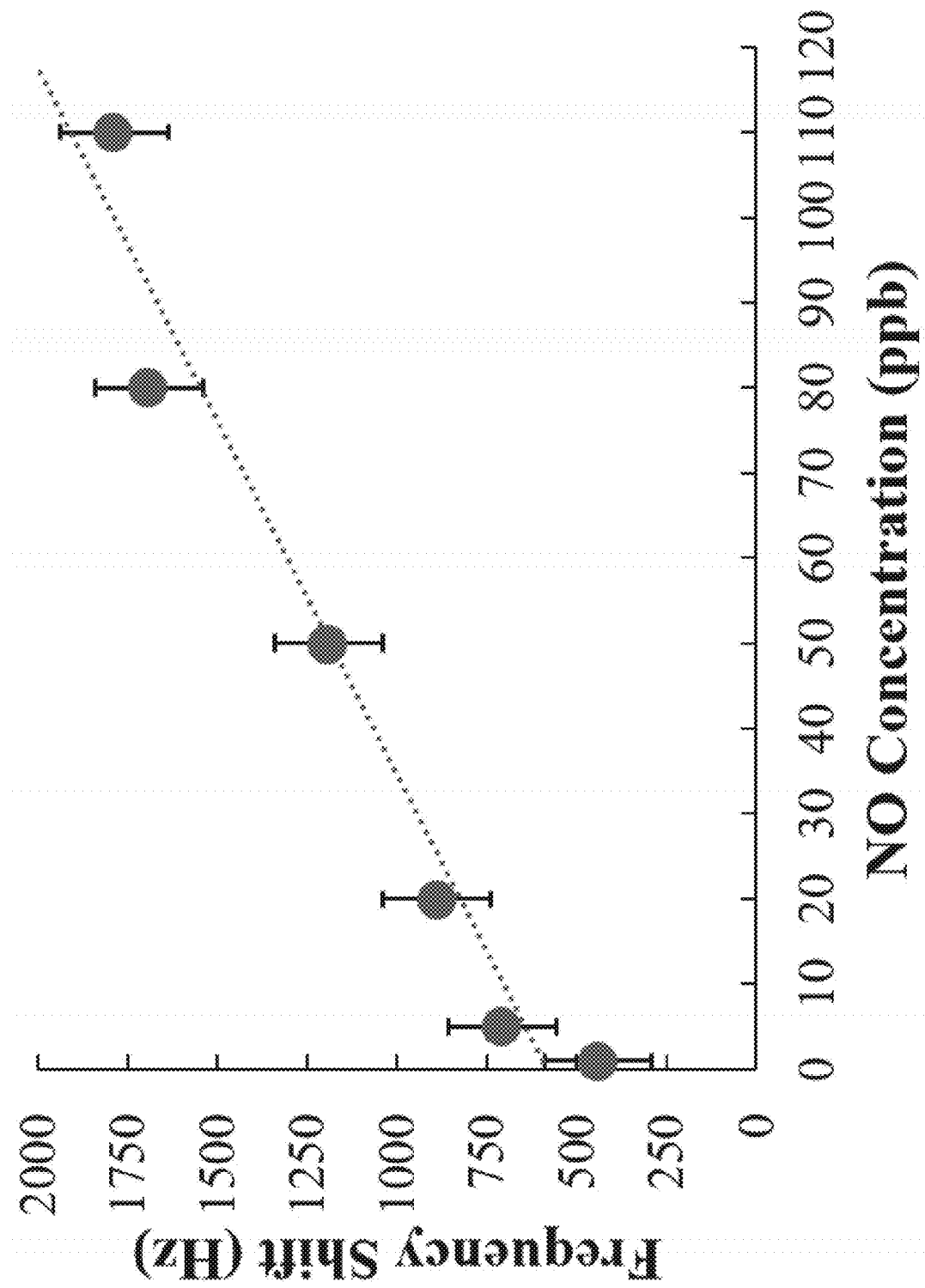
FIG. 7 is a chart illustrating the frequency response of the gas sensing system to different concentrations of nitric oxide gas in a dry air environment.
Figure 8:
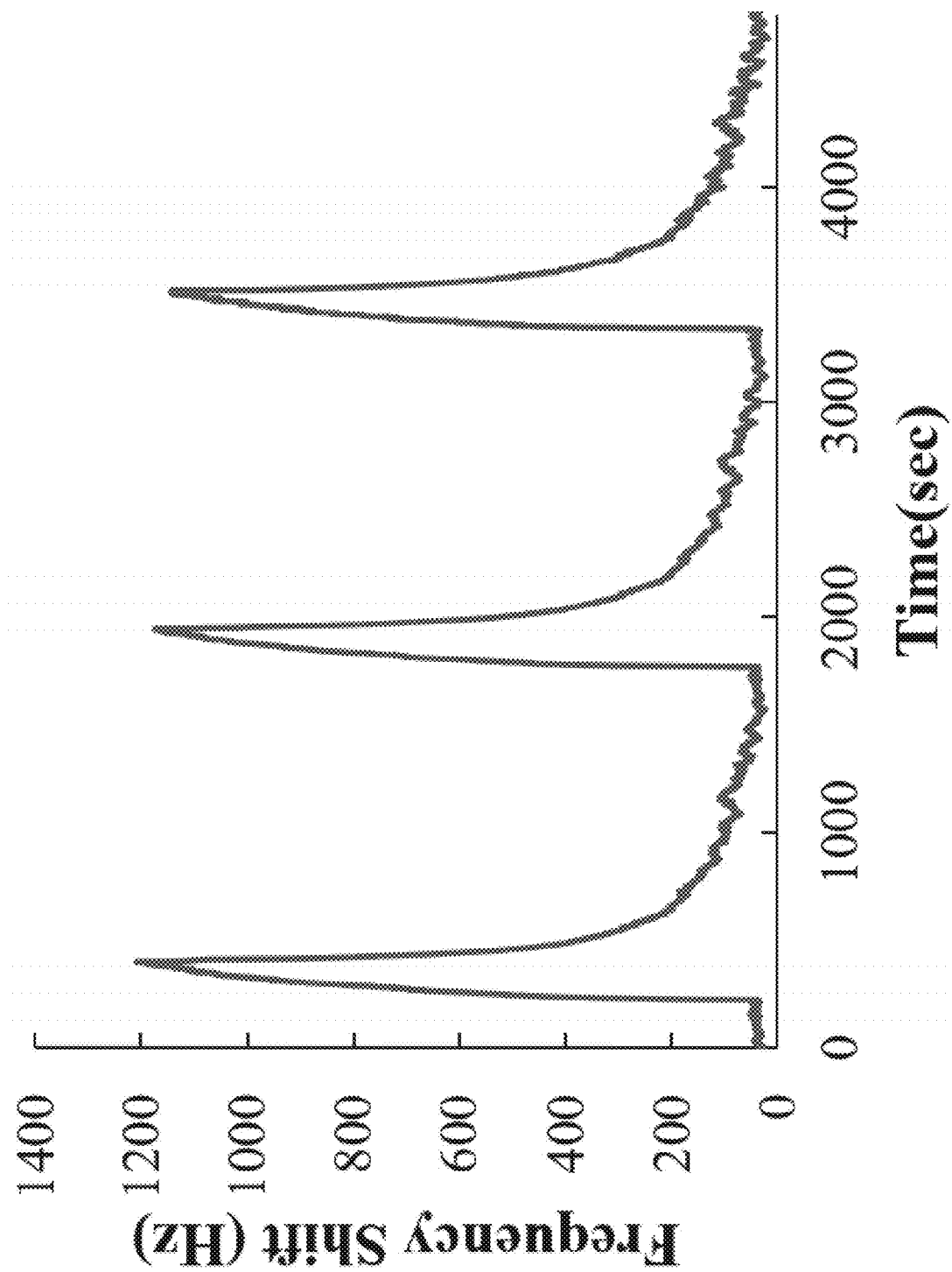
FIG. 8 is a chart illustrating the frequency response of the gas sensing system to 50 ppb of nitric oxide experiment in a dry air environment for three consecutive times.

The characteristics analyzed by the present invention include linearity, sensitivity, reversibility, repeatability, long-term stability, response time, recovery time, and selectivity. FIG. 7 shows the frequency response results of rGO/WO$_3$/PPy nanocomposite film coated on the surface acoustic wave element 212 under different concentrations of nitric oxide (NO) gas in a dry air environment. Every data is the average value of three experiments, and FIG. 7 shows that the frequency response increases linearly with the increase in NO concentration. In addition, it can also be observed that the frequency response is positive, so it can be deduced that the main sensing mechanism of the gas sensor 2 with rGO/WO$_3$/PPy nano composite film in the present invention is the elastic effect mentioned in the three major mechanisms. This proves that under the condition of dry air at room temperature, the gas sensor 2 with rGO/WO$_3$/PPy nanocomposite film can sensitively detect NO at a concentration of 1-110 ppb. As mentioned in the description of the prior art, the concentration of nitric oxide exhaled by normal people is between 5 and 35 ppb, and the concentration of nitric oxide exhaled by the patients with asthma is higher, which is between 25 and 80 ppb. Therefore, the gas sensor 2 of the present invention does have the capability to detect asthma.

In addition, the following table lists the frequency response, response time and recovery time of the gas sensing system to different concentrations in a dry air environment. The response time of the present invention is defined as the time required for the response frequency to rise to 90% of the maximum response amount after the detected gas is input. The recovery time is defined as the time required for the response frequency to return to 90% of the base line after the detected gas is removed. From the table below, both the response time and the recovery time of the present invention are within 2 minutes.

| NO concentration (ppb) | 1 | 5 | 20 | 50 | 80 | 110 |
|---|---|---|---|---|---|---|
| Frequency response (Hz) | 440 | 707 | 888 | 1190 | 1691 | 1788 |
| Response time (sec) | 119 | 120 | 128 | 128 | 112 | 108 |
| Recovery time (sec) | 97 | 101 | 123 | 115 | 119 | 120 |

The definition of sensitivity is shown as in equation (5):

$$\text{Sensitivity} = \frac{\Delta f}{\Delta C} \quad (5)$$

Wherein Δf is the change of frequency response in the linear region, and ΔC is the change of NO concentration in the linear region, that is, the sensitivity is equal to the slope of the asymptote illustrated in FIG. 7. After calculation, the sensitivity of the gas sensor 2 is 11 ppb/Hz. In addition, when the gas sensor 2 detects 1 ppb NO gas, the frequency response is 440 Hz and the signal-to-noise ratio (S/N) is 9.8 dB. The minimum detectable concentration of the gas sensor 2 is defined as the concentration at the condition when S/N is 3, so as it can be presumed that the minimum detectable concentration of the gas sensor 2 of the present invention is 0.3 ppb.

Figure 9:
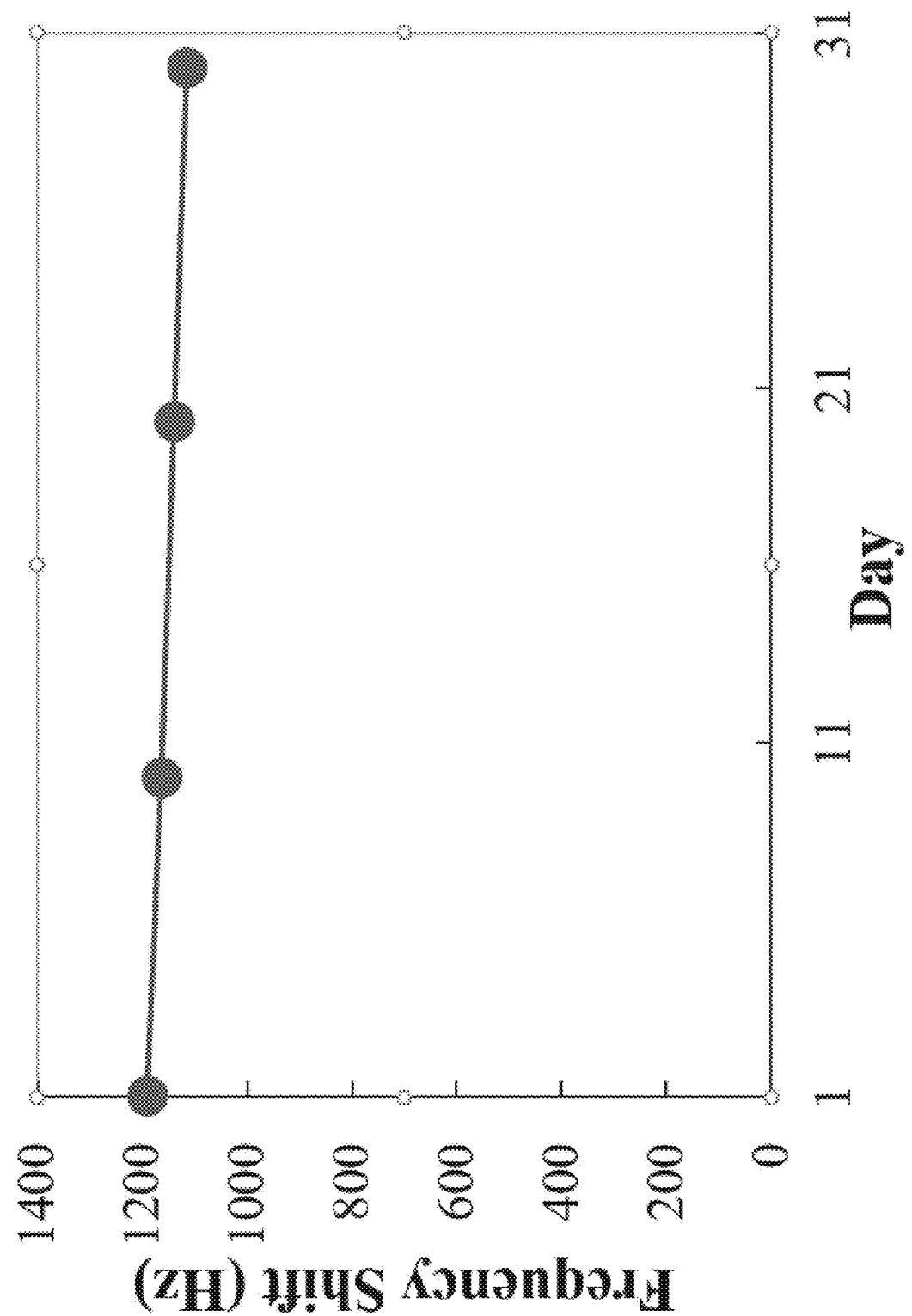
FIG. 9 is a chart illustrating a long-term response characteristic of the gas sensing system to a nitrogen gas of 50 ppb in a dry air environment.

A gas sensor 2 with good sensing characteristics is not only required to have a good sensitivity of the detected gas, but also needs to have repeatability and long-term stability. The present invention performs a repeatability experiment on a gas sensor 2 with an rGO/WO₃/PPy nanocomposite film. 50 ppb of NO is input for three consecutive experiments, and each experiment is performed at 1-hour interval. The result as shown in FIG. 9 is that the first frequency response is 1190 Hz, the second frequency response is 1100 Hz, and the third frequency response is 1050 Hz. The repeatability is defined as equation (6):

$$\text{Repeatability} = \frac{f_{n+1}}{f_1} \times 100\% \quad (6)$$

Wherein $f_1$ is the frequency response of the first detection, and $f_{n+1}$ is the frequency response of the (n+1)th detection. The gas sensor 2 with rGO/WO₃/PPy nanocomposite film shows the repeatability of 92.4% in the third detection, which indicates that the gas sensor 2 has good repeatability.

In addition, FIG. 9 shows that the gas sensor 2 performs an experiment on 50 ppb NO every 10 days, and the frequency response measured after 30 days still maintains 90% of the response on the first day, which proves its good long-term stability.

Selectivity is also one of the important items to test the characteristics of the sensor. In order to further study whether the gas sensor 2 of the present invention is selective or not, 5 ppm of NO₂, 30 ppm of NH₃ and 55 ppm of CO₂ are selected as interference gases. The results are as shown in FIG. 9. The vertical axis, selectivity (Hz/ppb), is defined as (frequency response/gas concentration). The definition of selectivity is shown in equation (7):

$$\text{Selectivity} = \frac{S_{NO} - S_{int}}{S_{NO}} \times 100\% \quad (7)$$

Wherein $S_{NO}$ and $S_{int}$ are the sensitivity of the gas sensor 2 to respectively detect NO and interference gas.

Figure 10:
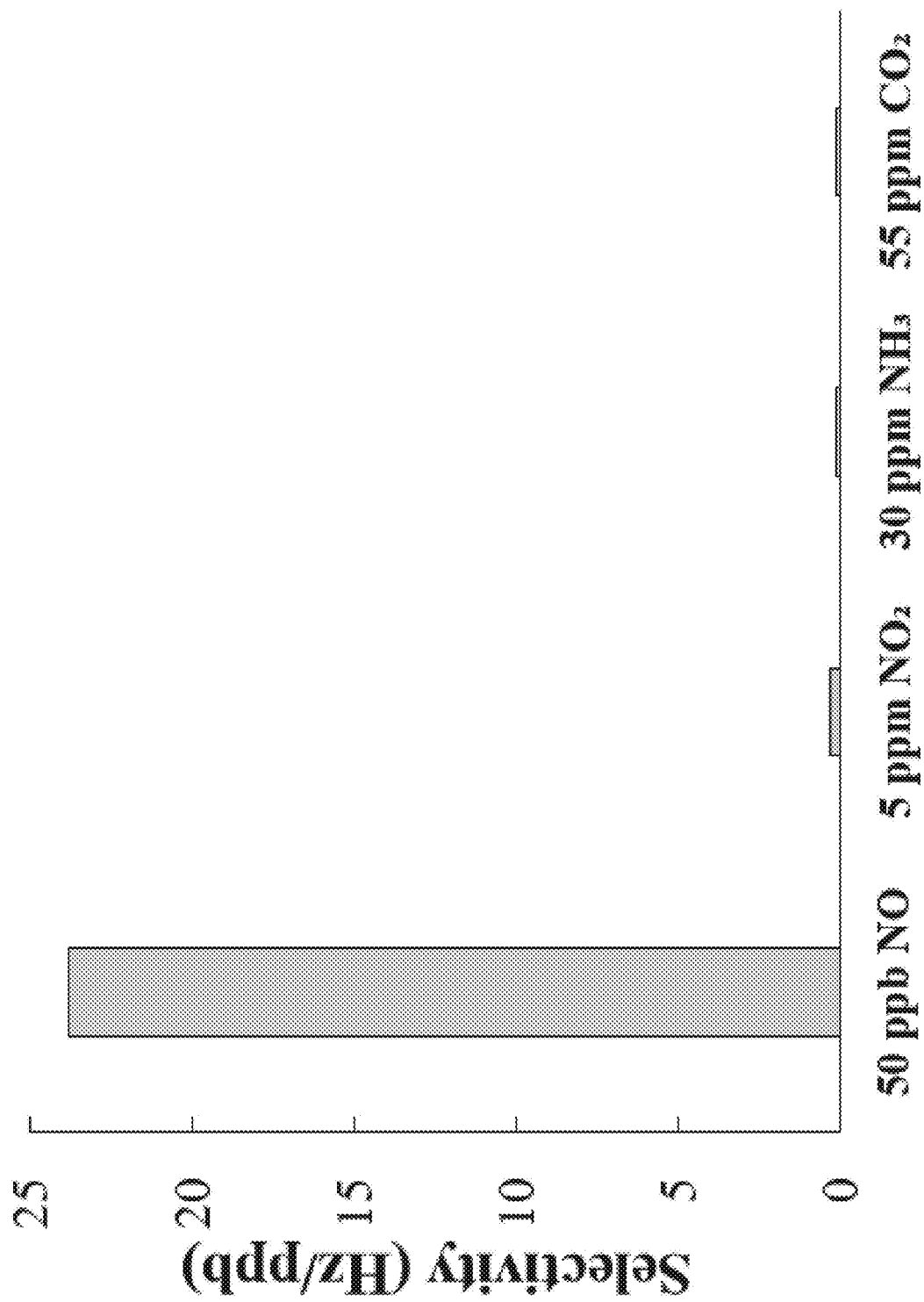
FIG. 10 is a histogram illustrating the selectivity of the gas sensing system to other interfering gases with different concentrations in a dry air environment.

Refer to FIG. 10, it can be known that compared with higher concentration nitrogen atom gas like 5 ppm of NO₂ and 30 ppm of NH₃ and 55 ppm of CO₂, 50 ppb NO has a selectivity higher than 99%, which shows the gas sensor 2 with rGO/WO₃/PPy nanocomposite film has the capability to selectively detect ppb level of NO in the dry air at room temperature and the interference effects probably caused by interfering gases can be negligible.

In conclusion, from the above testing results, it is found that the gas sensor 2 of the present invention, through the design of rGO/WO₃/PPy nanocomposite film, in the range of 1-110 ppb NO, the frequency response increases linearly with the increase of NO concentration. The main sensing mechanism is the elastic effect of the three perturbation mechanisms, and the sensitivity is 11 ppb/Hz, and the response time and recovery time are within 2 minutes. When the gas sensing system of the present invention detects 1 ppb NO gas, the change of frequency response is 440 Hz and the signal-to-noise ratio (S/N) is 9.8 dB, so the minimum detectable concentration is presumed to be about 0.3 ppb. In addition, the repeatability of the experiment at the third time is 92.4%, and the frequency response measured after 30 days still maintains 90% of the response on the first day. It also shows selectivity higher than 99% toward ppb level of NO. From the above results, it can be known that the gas sensor 2 with rGO/WO₃/PPy nanocomposite film of the present invention has good linear response, sensitivity, reversibility, repeatability, long-term stability and selectivity to ppb level of NO, and has potential for biomedical detection of asthma.

Although the present invention has been explained in relation to its embodiments, it is to be understood that many other possible modifications and variations can be made without departing from the scope of the invention as hereinafter claimed.

What is claimed is:

1. A gas sensor comprising:
   a basic part including a circuit board, and at least one surface acoustic wave element disposed on the circuit board; and
   a sensing layer deposited on the surface acoustic wave element, wherein the sensing layer is a nanocomposite film of reduced graphene oxide, and tungsten oxide, and polypyrrole;
   wherein in the sensing layer, a weight ratio of reduced graphene oxide: tungsten oxide: polypyrrole is between 1:1:2 and 3:1:5.

2. A gas sensing system comprising:
   a bearing unit provided with a gas flow channel;
   a gas sensor disposed in the bearing unit and capable of sensing the gas flowing from the gas flow channel, wherein the gas sensor includes a basic part and a sensing layer deposited on the basic part, the basic part is provided with a circuit board, and at least one surface acoustic wave element disposed on the circuit board, and the sensing layer is a nanocomposite film of reduced graphene oxide, and tungsten oxide, and polypyrrole; and
   a detecting unit electrically connected to the gas sensor;
   wherein in the sensing layer, a weight ratio of reduced graphene oxide: tungsten oxide: polypyrrole is between 1:1:2 and 3:1:5.

3. The gas sensing system as claimed in claim 2, wherein the bearing unit includes a base, an upper cover capable of opening and closing relative to the base, and a sealing ring provided on one side of the upper cover facing the base, the gas sensor is provided on the base, when the upper cover is closed on the base, the sealing ring presses against the base and define a space, and the surface acoustic wave element is located in the space.

4. The gas sensing system as claimed in claim 3, wherein the gas flow channel is located on the upper cover and provided with an inlet, a first hole communicating with the inlet, a second hole spaced from the first hole, and an outlet communicating with the second hole, the first hole and the second hole are located in the area surrounded by the sealing ring and correspond to the position where the surface acoustic wave element is located.

5. A manufacturing method of a gas sensor comprising:
a basic part manufacturing step to place a surface acoustic wave element on a circuit board;
and a sensing layer manufacturing step, tungsten oxide gel and reduced graphene oxide are added into pyrrole monomers to prepare a nanocomposite gel of reduced graphene oxide, and tungsten oxide, and polypyrrole by an in-situ chemical oxidative polymerization approach, and the nanocomposite gel is coated on the surface acoustic wave element and dried to form a sensing layer, wherein the sensing layer is a nanocomposite film of reduced graphene oxide, and tungsten oxide, and polypyrrole.

6. The manufacturing method of the gas sensor as claimed in claim 5, wherein in the sensing layer manufacturing step, the weight ratio of reduced graphene oxide: tungsten oxide: polypyrrole is between 1:1:2 and 3:1:5.

7. The manufacturing method of the gas sensor as claimed in claim 5, wherein in the sensing layer manufacturing step, ammonium persulfate is added to the mixture of tungsten oxide, and reduced graphene oxide, and pyrrole and maintains the temperature below 10° C., so that the pyrrole monomer is able to polymerize.

8. The manufacturing method of the gas sensor as claimed in claim 5, wherein in the sensing layer manufacturing step, the nanocomposite gel is spin-coated on the surface acoustic wave element, and after being dried, it is placed in an oven for annealing.

* * * * *